Sept. 10, 1968      R. F. BURDYN      3,400,819

METHOD AND APPARATUS FOR PARTICLE SEGREGATION

Filed Sept. 18, 1964      4 Sheets-Sheet 4

United States Patent Office 3,400,819
Patented Sept. 10, 1968

3,400,819
METHOD AND APPARATUS FOR PARTICLE SEGREGATION
Ralph F. Burdyn, Dallas, Tex., assignor to Mobil Oil Corporation, a corporation of New York
Continuation-in-part of application Ser. No. 161,490, Dec. 22, 1961, which is a continuation-in-part of application Ser. No. 39,071, June 27, 1960. This application Sept. 18, 1964, Ser. No. 397,497
6 Claims. (Cl. 209—270)

This application is a continuation-in-part of U.S. patent application Ser. No. 161,490, entitled "Method and Apparatus for Particle Separation", filed by Ralph F. Burdyn on Dec. 22, 1961, now abandoned which in turn is a continuation-in-part of U.S. patent application Ser. No. 39,071 filed June 27, 1960, and now abandoned.

This invention relates to particle segregation. More specifically, this invention relates to a method and apparatus for the selective segregation of particles based on particle size and density.

Various methods and apparatus have been applied to the problems of segregating particles having different characteristics. Of consideration here are both the segregation of particles from each other and the separation of particles from fluid mediums which may be serving as carriers for the particles. Examples of processes to which the invention is applicable are the treatment of gases, the treatment of fluids containing various solid matter which requires segregation according to particle characteristics such as size and density, and the segregation of uranium isotopes. Gases may have suspended therein various liquid and solid particles which require segregation from each other and separation from the gases in which the particles are suspended. A mixture of gases may require segregation in accordance with the molecular weights of the various particles which make up each of the gases comprising the mixture. In the field of isotope separation, it may be desired to segregate uranium-235 and uranium-238.

A particularly important problem encountered in the petroleum industry is the treatment of drilling fluids which involves the processing of large quantites of fluids containing particles of solid matter which are to be retained in the drilling fluid system and particles of solid matter which are picked up by the fluid during drilling and are to be removed from the system. The solids content of a drilling fluid must be carefully controlled to insure that the drilling fluid will function properly in the drilling operation. Control of viscosity and weight are conditions which must be considered in the preparation and handling of drilling fluids. The drilling fluid may be weighted with a relatively high density powdered material, such as barite. The viscosity of the drilling fluid is controlled to a value consistent with desirable low pumping energy requirements and within the degree required for proper borehole conditioning. During the circulation of the drilling fluid through a borehole, finely divided cuttings accumulate in the fluid and the viscosity of the fluid consequently increases, oftentimes to a state of nonpumpability. Such conditions present a need for both removing some of the finely divided cuttings and re-establishing the needed viscosity of the fluid. The accumulated cuttings must be separated from the needed weighting materials. The viscosity can be reduced by the addition of suspending medium, but in a closed circulating system, withdrawal of an amount of fluid equivalent to that added must be made. Without the employment of methods and apparatus to segregate the unwanted cuttings from those which are to be retained, the withdrawal of fluids in amounts equal to those added to reduce the viscosity results in the loss of expensive weighting materials which materially adds to the drilling costs.

A commonly employed apparatus for the separation of solid particles from fluids has been the centrifuge. In operation, the centrifuge normally requires rotation of the entire mass of material being treated. Also, the rotation of the entire mass of material being treated results in a concentration of material in the form of a sludge along the inner walls of the rotating bowl of the centrifuge. Because of certain peculiar characteristics of some drilling fluids, difficulties are encountered in the use of a centrifuge to carry out fluid and solid separation processes. Drilling fluids containing solids are so constituted that they tend to gel or set under static conditions. These types of drilling fluids, when treated in a centrifuge where the entire mass attains the angular velocity of the rotating portions of the centrifuge, will tend to gel and thus reach a consistency which will oppose the needed migration of the particles to be separated.

It is an object of the present invention to provide a method and apparatus for effecting particle segregation in accordance with particle size and density. It is another object of the invention to provide a method and apparatus for effecting particle segregation employing a permeable rotating annular member wherein it is unnecessary to rotate the entire mass of material being treated at the speed of the rotating member. These and further objects of the invention will be evident from a reading of the following specification taken in conjunction with the accompanying drawings.

It has been found that by subjecting a body of fluid being treated to the herein disclosed type of centrifugal action along a substantially cylindrical permeable boundary and imposing a pressure differential across the boundary which tends to effect fluid flow through the boundary in opposition to the centrifugal action, a condition is set up which effects particle segregation in accordance with particle weight and size distribution.

It is theorized that within the zone along the cylindrical boundary, a relatively thin film is established in which laminar flow exists. In the zone between this thin film and the inner wall of the container in which the segregation process is carried out, that is, in that space radially outward from the thin film along the cylindrical boundary, a condition of high turbulence exists. This is to be contrasted with the condition existing in a conventional centrifuge where the entire mass of material being treated is rotated and thus turbulence does not exist.

The fluid to be treated is introduced into an enclosed pressure-tight chamber. A portion of the fluid within the chamber is subjected to centrifugal action in an amount predetermined in accordance with the particle segregation which is desired. The centrifugal action is effected within a portion of the fluid along a substantially cylindrical boundary. Simultaneously with the imposition of the centrifugal action, the fluid is subjected to a pressure differential across the cylindrical boundary to effect fluid flow through and toward the center of the boundary. That portion of the fluid which flows through and toward the center of the boundary, which shall be referred to hereinafter as the "effluent," is withdrawn from the vessel along a flow path which extends from within the interior of the boundary to a location outside of the vessel. The remaining portion of the fluid within the vessel, which shall be referred to hereinafter as the "underflow," including those particles which have not penetrated the boundary, is withdrawn from the vessel. The degree of particle segregation may be controlled by variation of factors including the quantity of fluid flowing through the cylindrical boundary and the amount of centrifugal action employed.

Illustrated in the accompanying drawings is apparatus which may be employed in carrying out the method of the invention.

Figure 1:
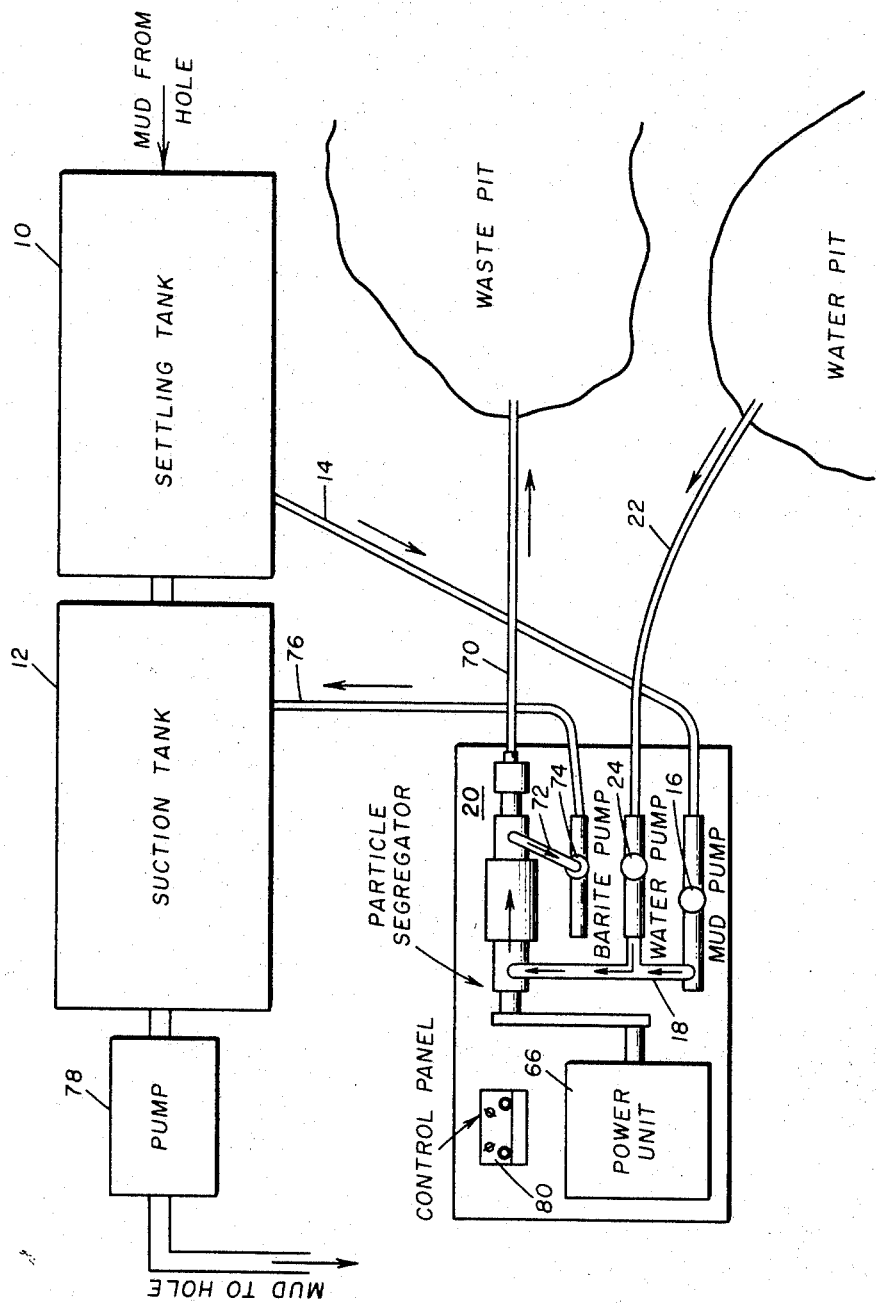
FIGURE 1 is a flow diagram showing a particle segregator in accordance with the present invention employed in a system for recovering barite from contaminated drilling mud.

Referring now to the drawings and more particularly to FIGURE 1, the particle segregator is shown for purposes of illustration as incorporated within a drilling fluid circulation system. Drilling fluid commonly referred to as mud is recovered from a borehole and passed to a mud pit which in the illustrated embodiment includes a settling tank 10 and a suction tank 12. Drilling fluid is withdrawn from the settling tank through conduit 14 by a mud pump 16, which is preferably a positive displacement pump, and is introduced through inlet conduit 18 into a particle segregator generally designated by reference numeral 20 which is mounted on a skid or other suitable support. To avoid attaining too high a viscosity of the drilling fluid containing the retained barite or other weighting agent, and to provide make up liquid, water may be withdrawn from a water pit through line 22 by water pump 24 and introduced into inlet conduit 18 to dilute the feed to the particle segregator. Preferably the amount of water added effects a volume dilution ratio of about 0.6 in the fluid in conduit 18. While it is preferred that the water dilute the feed to the segregator, it is apparent that the water may be alternatively added elsewhere in the system.

Figure 2:
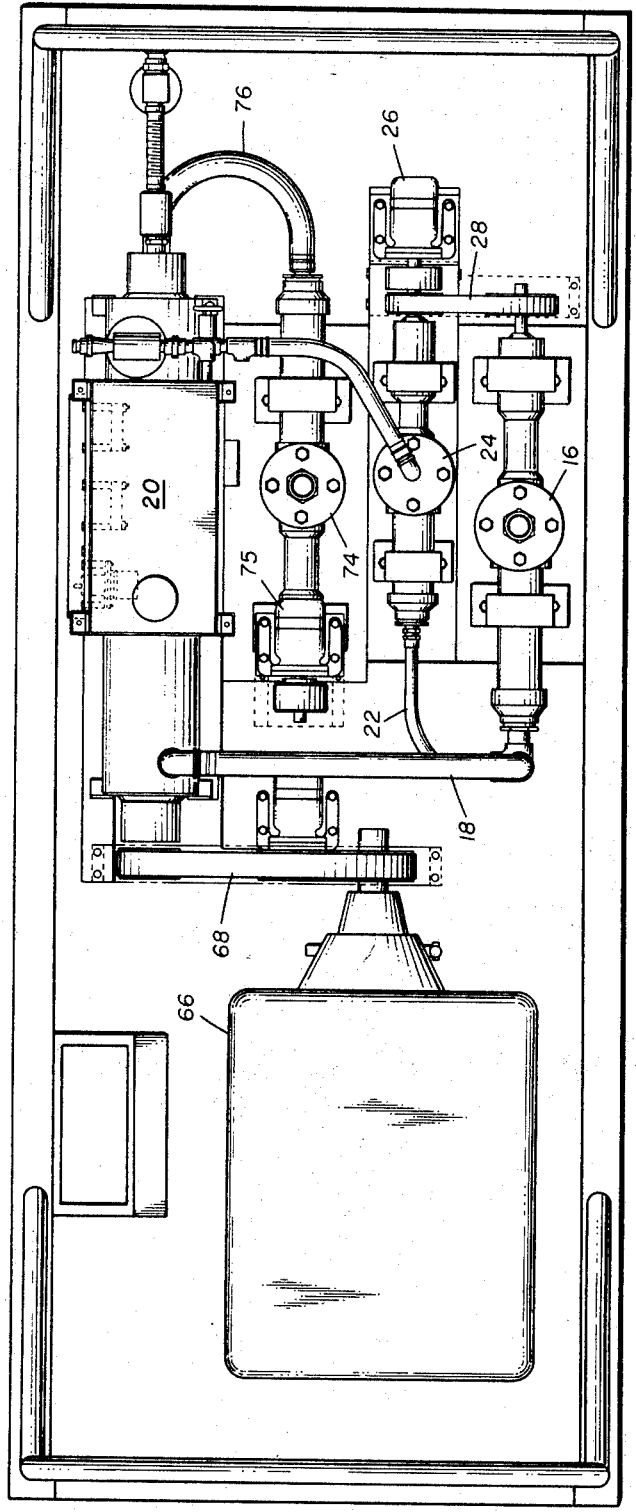
FIGURE 2 is a plan view of a particle segregator in accordance with the present invention.
Figure 3:
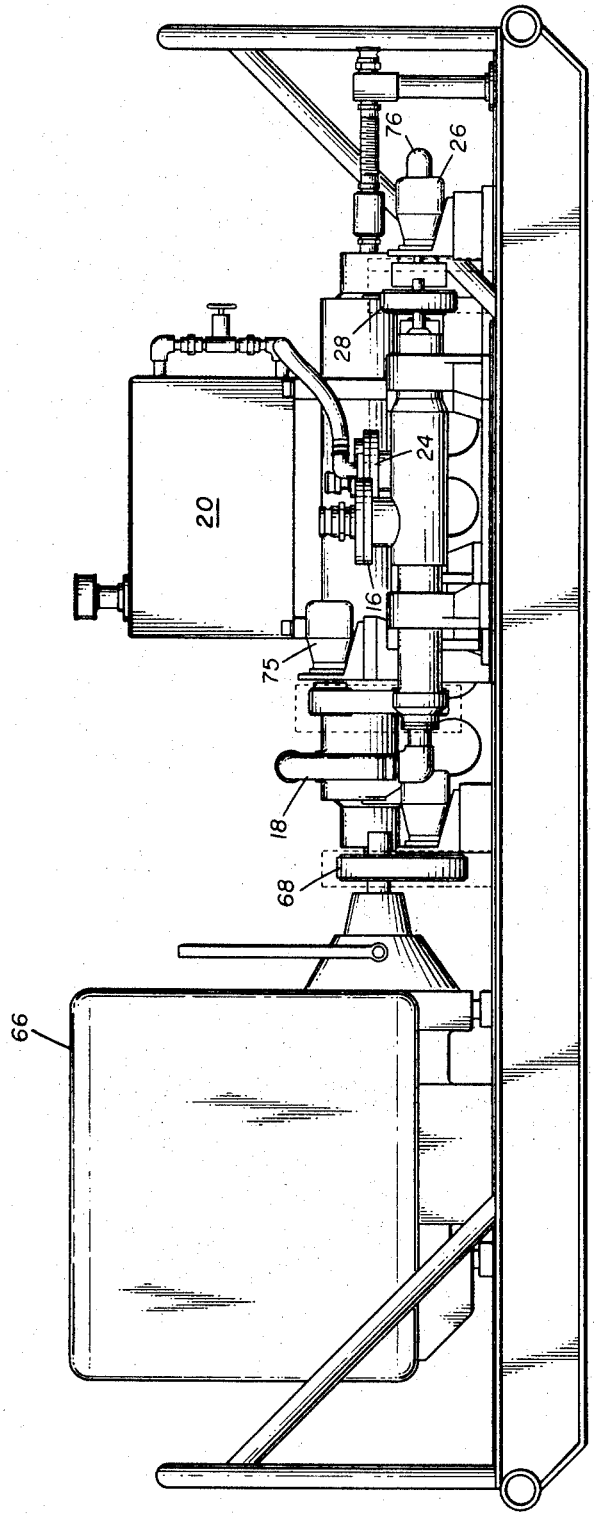
FIGURE 3 is a side view of the particle segregator shown in FIGURE 2.

As shown in FIGURE 2, a motor 26 provides a common drive for mud pump 16 and water pump 24 by means of a drive belt 28.

Figure 4:
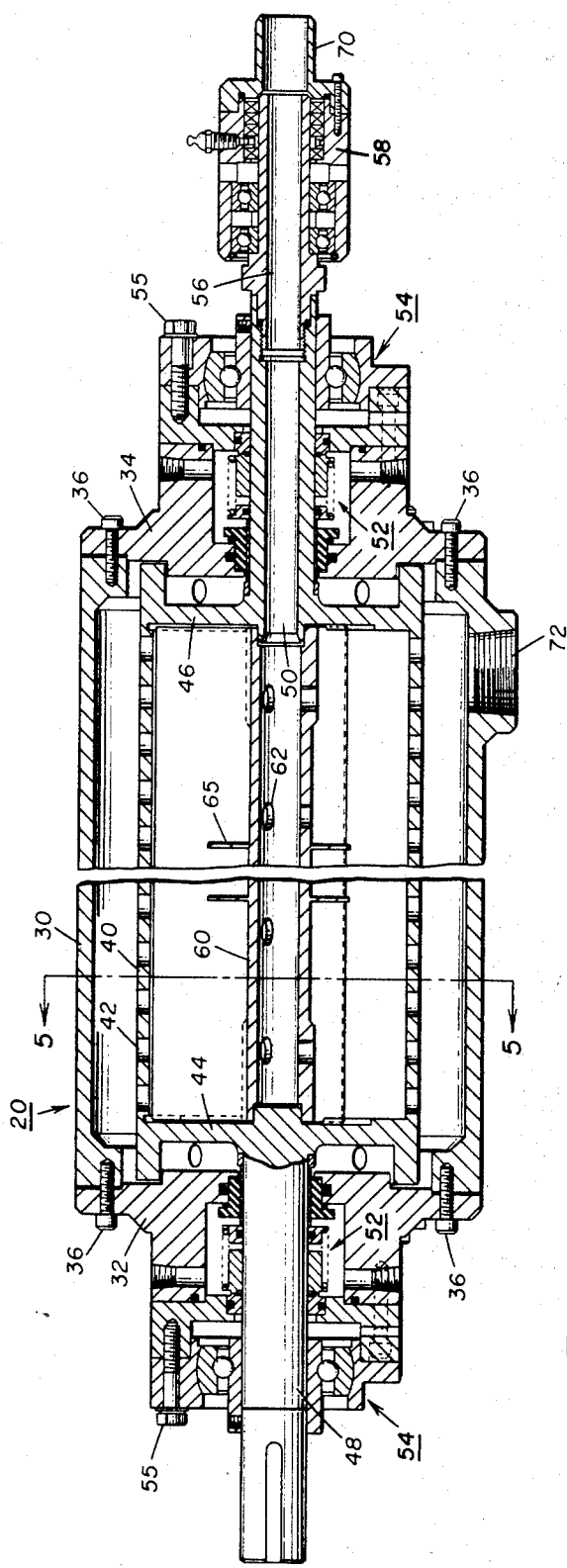
FIGURE 4 is a longitudinal section taken through the particle segregator.

Referring now to FIGURE 4, the particle segregator 20 incudes a cylindrical outer casing 30 which is united with a pair of opposed end members 32 and 34 by capscrews 36 to form a pressure-tight chamber. While the casing is shown as being substantially cylindrical in shape, it may have any other desired configuration since not all of the fluid and solid material treated within the chamber have to be subjected to centrifugal action at the same time. Positioned within the chamber is a rotatable, hollow cylinder 40 provided with a plurality of openings 42 extending through the cylindrical wall over substantially the entire surface thereof. Openings 42 are preferably evenly distributed over the surface of the cylinder. Cylinder 40 is supported by a pair of solid end plates 44 and 46. End plate 44 is secured to a driven shaft 48 while end plate 46 is secured to a hollow shaft 50. Suitable rotary sealing units generally designated by reference numeral 52 surround driven shaft 48 and hollow shaft 50 to prevent leakage from the chamber within casing 30. The sealing units may include means for introducing a sealing fluid under pressure greater than that in the chamber into the annulus between each shaft and its respective end member. Suitable bearings generally designated by reference numeral 54 which are of the ball-bearing type are fastened by capscrews 55 or other suitable means to the end members 32 and 34 to permit free rotation of shafts 48 and 50. A rotating union 56 is threaded to the outer end of shaft 50 and is supported in a coupling 58.

Figure 5:
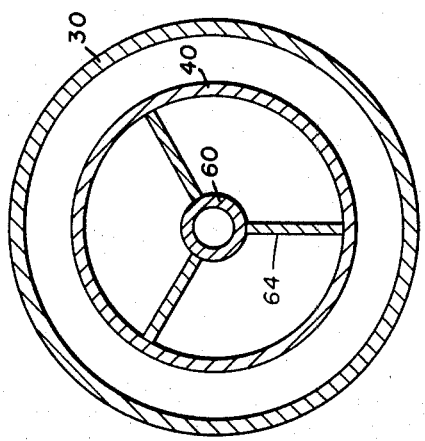
FIGURE 5 is a transverse section taken on line 5—5 of FIGURE 4.

A discharge pipe 60 provided with apertures 62 is supported within the cylinder 40 with one end thereof in communication with the hollow shaft 50. A plurality of vanes 64 extend radially outwardly from pipe 60 to cylinder 40 and are supported by annular braces 65. In the illustrative embodiment, three vanes are employed as is evident from FIGURE 5 so that the annulus between pipe 60 and cylinder 40 is divided into three segments. The provision of such vanes is advantageous since they enable operation over a wide range of throughput without materially affecting the fluid pressure within the particle segregator. In the absence of such vanes, there would be substantial increases in internal pressure within cylinder 40 with increasing flow rates. Higher internal pressures require more horsepower to pump the drilling fluid into the cylinder and require more rugged construction of parts. In one instance without vanes, there was an approximately threefold increase in internal pressure at a higher flow rate. In contradistinction, at the same higher flow rate there was substantially no increase in pressure when vanes were employed in the cylinder. It will be understood that the invention is not limited to apparatus employing three such vanes, since any number of vanes from a minimum of at least two may be employed.

Cylinder 40 is rotated at a predetermined speed by means of a power unit 66 such as a diesel engine, suitable reduction gearing, a drive belt 68, and associated pulleys which drive shaft 48.

Cylinder 40 functions to generate the previously discussed permeable substantially cylindrical boundary within the fluid being treated to impart centrifugal force to that portion of the fluid immediately surrounding the cylinder. Fluid flowing through perforations 42, together with the relatively light, solid particles which have been drawn through the boundary, comprise the effluent stream which is removed from the interior of cylinder 40 by way of the apertures 62 in pipe 60, hollow shafts 50 and 56, and a discharge conduit 70 leading to a waste pit or other point of disposal or further treatment.

The remainder of the fluid, including the solid particles having a weight above a predetermined value so that their inward flow momentum due to the fluid pressure differential is overcome by centrifugal force, is withdrawn through a discharge conduit 72 in casing 30 at a controlled rate by a barite pump 74 and passed through conduit 76 to the suction tank 12. From the suction tank the recovered drilling fluid is recycled as needed to the borehole by a pump 78.

Control means including a control panel 80 are provided to regulate the process variables. The control means preferably include hydraulic control valves operatively connected to motor 26 and to a motor 75 associated with barite pump 74 so that the system can be preset for predetermined flow rates and subsequently started by merely engaging the clutch of the power unit.

It has now been found that there are certain correlations between the size of various elements of the particle segregator which must be met if a useful separation is to be achieved. These correlations include the size of openings 42 relative to the diameter of the cylinder and to the size of the particles treated, the total area of openings 42 relative to the area of cylinder 40, and the length-to-radius ratio of cylinder 40.

Openings 42 should be at least several times as large as the largest particles in the material being treated to prevent several particles collectively forming a bridge over the openings and effectively closing off the openings. It is possible for each of these openings to be several times as large as the largest particles in the material being treated because the segregation process is not in any way dependent upon a filtering or screening action by the openings in the rotatable cylinder. If the openings were made small enough to permit bridging, the apparatus could become inoperative due to particles clogging openings 42. Successful operations have been performed where the diameters of the perforations ranged from as small as $\frac{1}{64}$ inch to $\frac{5}{8}$ inch. The size of the openings which can be usefully employed in a given segregator has been found to be contingent upon the diameter of the rotating cylinder. The ratio of the diameter of openings 42 to the diameter of cylinder 40 is preferably between about 0.01 and 0.1. At ratios below the above-mentioned lower limit, the possibility of bridging of the openings is increased. At ratios above the upper limit of the preferred range, the efficiency of the separation is decreased and less barite is recovered. It is theorized that the decreased efficiency results from the larger openings causing irregularities in the boundary layer formed at the surface of the rotating cylinder.

The total area of openings 42 should be between about 5 to 30 percent of the total area of cylinder 40, exclusive of the end portion, and most preferably between about 15 to 25 percent of the total cylindrical surface area of the cylinder. While operation outside of these ranges will enable some separation to be effected, the amount of separation achieved is not sufficient to provide a process which can compete with known separating processes or a process in which the degree of separation achieved is sufficient to be deemed useful by ordinary commercial standards.

For good operating efficiency it is preferred that the length-to-radius ratio of the rotatable cylinder be at least 6.0 and preferably about 16. Such ratios are preferred since for a cylinder of given volume, the horsepower required to rotate the cylinder is directly dependent upon the fourth power of the radius. It will thus be appreciated that the power requirements of a cylinder having a length-to-radius ratio in the above-mentioned range will have a greatly decreased power requirement when compared, for example, to a separator of the same throughput wherein the length and diameter of the rotatable cylinder are approximately equal.

It has also been found that for best operation the flow rate of the fluid mixture to the segregator and the flow rate of the streams discharging from the separator should be maintained fixed relative to the rate of rotation. This may be achieved by the control means and pumps discussed previously. The fluid mixture should also be supplied to the segregator at a constant pressure within the range of 15 to 45 p.s.i.g. If, on the other hand, the fluid mixture is supplied by means of a hydrostatic head, a constant rate of flow of the various streams relative to the rotation of the cylinder is not achieved and a less efficient particle segregation results.

It will be apparent that, while remaining within the preferred ranges of the correlations referred to above, a fairly wide range of designs are possible. For example, in a particular test model wherein the perforated cylinder was 5½ inches long, had an outside diameter of 1½ inches providing an effective area of 26 square inches, and the perforations were $\frac{1}{16}$ inch in diameter; no appreciable variation in efficiency of operation was detected where the cylinder was provided with 200 perforations as compared with a cylinder of the same dimensions having a total of 1,580 perforations. However, when the total number of perforations in the cylinder was increased to 3,300 so that the total area of the openings was about 39 percent of the area of the cylinder, the efficiency of the apparatus fell from about 96 percent to approximately 86 percent. In a particular commercial size model of the apparatus adapted to drilling fluid treatment, very efficient operation was obtained with a cylinder which had an outside diameter of about 8 inches, and had openings of $\frac{5}{8}$ inch diameter.

Design parameters in accordance with the present invention will be more fully described hereinafter in connection with a drilling fluid process wherein the following assumptions and determinations are made with respect to the drilling fluid and the desired particle segregation which is to be carried out.

(1) The density of the drilling fluid is 17 pounds per gallon.

(2) The composition of the drilling fluid, as determined by analysis or based on a knowledge of the material from which it was prepared, is:

(a) 8.4 volume percent of light solids (includes clays picked up during drilling).
(b) 27.5 volume percent of barite (a weighting material).
(c) 64.1 volume percent of water.

(3) The apparatus is to segregate the barite particles such that only 5 percent of them shall appear in the effluent stream. Since some of the barite particles will always be in the size range of the clay particles which are to be segregated from the barite, complete segregation of the clay particles without removing a small portion of the barite particles is not practical.

(4) The desired segregation of the unwanted clay particles in the 5 percent of the barite particles occurs with an effluent stream of approximately 10 gallons per minute. This is within the range of the volume of drilling fluid which normally must be treated in the average well drilling operation.

(5) The viscosity of the effluent stream which comprises principally light solids, including the clay particles, the 5 percent of the barites, and water, is calculated to be 3 centipoises. The viscosity of the drilling fluid to be treated, that is, its viscosity prior to introduction into the apparatus, is determined to be 40 centipoises.

(6) The light solids fraction of the drilling fluid, that portion containing the major quantity of the entrained clay particles which pass out of the apparatus in the form of the effluent stream, comprises a portion of the effluent stream since it is not repelled by the centrifugal action of the rotating cylinder. The composition of both the effluent stream and the underflow stream, the latter stream being that which carries the 95 percent of the barite which is retained for re-use, is as follows:

a. *Effluent*

| | Parts |
|---|---|
| Light solids | 0.0840 |
| Water | 0.6410 |
| Barite | 0.0138 |
| Total | 0.7388 | b. *Underflow*

0.2612 part barite.

Complete separation of the constituents of the above drilling fluid would result in all of the water passing through cylinder 40 and out of the apparatus as effluent and, consequently, result in leaving the 95 percent portion of the barites, which are to be retained, as a solid mass within the chamber. Obviously this is not desirable as there would be no means for removal of the solid mass of barites from the chamber other than a subsequent step of fluid flushing of the chamber. Therefore, additional water or drilling fluid is introduced into the chamber over and above that quantity which has been determined to be the desired amount to flow out as effluent in order to effect the needed separation. This additional water or drilling fluid added through line 22 functions solely as a carrier for the barites which are retained within the chamber to permit them to be removed from the chamber through conduit 72. The design and operation of the apparatus is based upon the characteristics and quantity of the effluent stream, and it is therefore not necessary that this additional water or drilling fluid enter into the calculations.

With the quantity of fluid passing out as effluent being 10 gallons per minute and the desired partition of the drilling fluid being as stated in Item 6 above, the amount of drilling fluid which will actually be treated by the apparatus is 10/0.7388=13.55 gallons per minute. Therefore, during each minute of operation of the apparatus, 95 percent of the barite is retained from the treatment of 13.55 gallons of drilling fluid.

The relationship of the various design parameters is expressed in the formula:

$$Q = \pi R^2 L \omega^2 \Delta \rho d^{*2}/9\mu \tag{1}$$

where (in consistent units)
$Q$ = the volumetric rate of flow of the effluent stream,
$R$ = the radius of perforated cylinder 40,
$L$ = the length of the perforated portion of the cylinder 40,
$\omega$ = the angular speed of perforated cylinder 40 in radians per second,
$\Delta \rho$ = the difference in density between the barite and the effluent stream,
$d^*$ = the maximum size of the particles to be separated, that is, the maximum size of the particles to pass out with the effluent, and
$\mu$ = the viscosity of the effluent stream.

Equation 1 can be expressed in more convenient engineering units as follows:

$$Q = KR^2 L N^2 \Delta \rho d^{*2}/\mu \tag{2}$$

where
$$K = 15.97 \times 10^{-12}$$
when
$Q$ = the volumetric rate of flow of the effluent stream in gallons per minute,
$R$ = the radius of the perforated cylinder 40 in inches,
$L$ = the length of the perforated portion of the cylinder 40 in inches,
$N$ = the angular speed of the perforated cylinder 40 in revolutions per minute,
$\Delta \rho$ = the difference in density between the barite and the effluent stream in pounds per cubic foot,
$d^*$ = the maximum size of the particles to be separated, that is, the maximum size of the particles to pass out with the effluent in microns, and
$\mu$ = the viscosity of the effluent stream in centipoises.

The values of the above design parameters based on the assumed conditions of the drilling fluid treated and the end result desired are as follows:

$Q$ = 10 gallons per minute
$\Delta \rho$ = 268 (density of barite) −75 (calculated density of effluent stream) =193 pounds per cubic foot
$\mu$ = 3 centipoises
$d^*$ = 2.2 microns (obtained from a particle size distribution of an average oil field barite)

Placing the above values in Equation 2 and solving for the group, $R^2LN^2$, it is found that:

$$R^2LN^2 = \frac{Q\mu}{15.97 \Delta \rho d^{*2} \times 10^{-12}} =$$

$$\frac{10 \times 3}{15.97 \times 193 \times (2.2)^2 \times 10^{-12}} = 2.02 \times 10^9$$

A speed of rotation for the perforated cylinder 40 is chosen commensurate with the limits imposed by the ability of the seals to function properly and the mechanical strength of the shaft. Assuming the rate of rotation to be 2400 revolutions per minute, the group, $R^2L$, therefore must have the value:

$$R^2L = \frac{2.02 \times 10^9}{(2400)^2} = 3.5 \times 10^2$$

Choosing an $L/R$ ratio of 15, so that $L=15R$, the radius of the perforated cylinder is determined in accordance with the following:

$$R^3 = \frac{3.5 \times 10^2}{15} = 23.3 \text{ inches}^3$$

Therefore, $$R = 2.85 \text{ inches}$$

and, since $L=15R$, $$L = 15 \times 2.85 = 42.75 \text{ inches}$$

In accordance with the foregoing calculations, a separating unit constructed in accordance with the invention to perform the desired particle segregation process with drilling fluid of the composition set out above will have the following specifications:

(1) Length of cylinder=42.75 inches
(2) Diameter of cylinder=5.70 inches
(3) Speed of cylinder=2400 revolutions per minute
(4) Capacity=13.55 gallons of 17 lbs./gallon drilling fluid per minute with 95 percent recovery of barite While the method and apparatus of the invention has been discussed primarily in terms of their application to the separation of a liquid and two diverse solids, that is, a liquid mixed with solids having different densities and sizes, it is to be understood that many other materials may be so treated. As previously stated, gases of different densities may be separated in accordance with the molecular weights, and isotopes, such as uranium-235 and uranium-238, may be separated in accordance with atomic weights. Separations may also be effected with a liquid and a single solid, two immiscible liquids of different densities and a solid, two immiscible liquids of different densities and a gas plus a solid. For example, very effective separation may be carried out between water and oil which have been emulsified. It is, therefore, to be understood that the term "fluid" is applicable to both the liquid and the gaseous state. It is also to be understood that the term "particle," as used herein, is intended to apply not only to the portions of solid matter treated but also to gas molecules, isotopes, and the droplets of liquid in the noncontinuous phase of an emulsion of two immiscible liquids.

What is claimed is:
1. Apparatus for effecting selective particle separation in a liquid mixture containing solid particles which have varying weights which comprises in combination:
a vessel provided with a pressure-tight closed chamber,
conduit means secured to said vessel for introducing said liquid mixture into said chamber,
hollow cylindrical means rotatably supported within said chamber, said cylindrical means having a cylindrical outer surface provided with a plurality of openings each of which is several times the cross sectional area of the largest particles in said mixture to prevent bridging of said particles over said openings, the total area of said openings being between 5 and 30 percent of the cylindrical surface area of said cylindrical means, the ratio of the diameter of said openings to the diameter of said cylindrical means being between about 0.01 and 0.1,
means to support and rotate said cylindrical means at a predetermined speed within said chamber,
conduit means for withdrawing an effluent portion of said liquid mixture from within said cylindrical means,
conduit means for withdrawing an underflow portion of said liquid mixture having an increased concentration of heavy solid particles from said chamber outside of said cylindrical means, said cylindrical means having a length to radius ratio of at least 6.0 with the length and radius being related in accordance with the formula:

$$Q = \pi R^2 L \omega^2 \Delta\rho d^{*2}/9\mu$$

$Q$ = the volumetric rate of flow of said effluent portion of said mixture,
$R$ = the radius of said cylindrical means,
$L$ = the length of said cylindrical means,
$\omega$ = the speed of said cylindrical means in radians per second,
$\Delta\rho$ = the difference in density between the heavy solid particles included with said underflow portion of said mixture and the density of said effluent portion of said mixture,
$d^*$ = the maximum size of particles included with said effluent portion of said mixture, and
$\mu$ = the viscosity of said effluent portion of said mixture.

2. Apparatus as defined in claim 1, wherein the total area of said openings is between 15 to 25 percent of the cylindrical surface area of said cylindrical means.

3. In a drilling fluid circulation system including a source of a drilling fluid mixture of liquid, weighting agent particles and cuttings; the improvement which comprises:

a stationary vessel having a pressure-tight chamber,
pump means for introducing said mixture into said chamber under pressure,
hollow cylindrical means rotatably supported within said chamber and having a cylindrical outer surface provided with a plurality of openings each of which has an area several times the cross-sectional area of the largest particles in said mixture to prevent bridging of the particles over said openings, the total area of said openings being between 5 to 30 percent of the cylindrical surface area of said cylindrcal means, said cylindrical means having a length to radius ratio of at least about 6.0, and the ratio of the diameter of said openings to the diameter of said cylindrical means being between about 0.01 and 0.1,
means to rotate said cylindrical means at high speed to impart centrifugal force to said mixture to effect particle segregation,
first conduit means for withdrawing an effluent portion of said mixture containing cuttings from within said cylindrical means,
discharge conduit means for withdrawing an underflow portion of said mixture having an increased concentration of weighting agent particles from said chamber,
control means operatively connected to said first conduit means, and to said discharge conduit means to regulate the flow rates through said first conduit means and said discharge conduit means in accordance with the flow rate of said liquid mixture into said chamber, and
the radius and the length of said cylindrical means being related in accordance with the formula:

$$Q = \pi R^2 L \omega^2 \Delta\rho d^{*2}/9\mu$$

$Q$ = the volumetric rate of flow of said effluent portion of said mixture,
$R$ = the radius of said cylindrical means,
$L$ = the length of said cylindrical means,
$\omega$ = the speed of said cylindrical means in radians per second,
$\Delta\rho$ = the difference in density between the heavy solid particles included with said underflow portion of said mixture and the density of said effluent portion of said mixture,
$d^*$ = the maximum size of particles included with said effluent portion of said mixture, and
$\mu$ = the viscosity of said effluent portion of said mixture.

4. In a method for effecting selective particle segregation in a fluid mixture containing solid particles of varying weights, the steps which comprise:

introducing said mixture into a closed chamber,
subjecting said mixture within said chamber to a constant pressure differential across a substantially cylindrical permeable boundary formed by rotating within said chamber a substantially cylindrical means provided with openings several times the cross sectional area of the largest particles in said mixture to prevent bridging by said particles over said openings to effect flow of said mixture inwardly toward said boundary, the total area of said openings being between 5 and 30% of the cylindrical surface area of said cylindrical means, said cylindrical means having a length to radius ratio of at least 6.0, and the ratio of the diameter of said openings to the diameter of said cylindrical means being between about 0.01 and 0.1.
creating a zone of rotation at said boundary to impose a centrifugal force upon said mixture whose magnitude is dependent upon the rate of rotation,
regulating the rate of rotation relative to said pressure differential so that the inward flow momentum of solid particles in said mixture having a weight above a predetermined value will be overcome and at least a major quantity of solid particles in said mixture having a weight below said predetermined value will pass through said boundary,
withdrawing as an effluent portion fluid which has passed through said boundary together with said particles having weights below said predetermined value,
withdrawing from a portion of said chamber outside of said boundary an underflow portion comprising fluid together with said particles having weights above said predetermined value, and
the radius and the length of said cylindrical means being related in accordance with the formula:

$$Q = \pi R^2 L \omega^2 \Delta\rho d^{*2}/9\mu$$

$Q$ = the volumetric rate of flow of said effluent portion of said mixture,
$R$ = the radius of said cylindrical means,
$L$ = the length of said cylindrical means,
$\omega$ = the speed of said cylindrical means in radians per second,
$\Delta\rho$ = the difference in density between the heavy solid particles included with said underflow portion of said mixture and the density of said effluent portion of said mixture,
$d^*$ = the maximum size of particles included with said effluent portion of said mixture, and
$\mu$ = the viscosity of said effluent portion of said mixture.

5. Apparatus for effecting selective particle separation in a liquid mixture containing solid particles of varying weights which comprises in combination:

a vessel provided with a pressure-tight closed chamber,
conduit means secured to said vessel for introducing said liquid mixture into said chamber,
hollow cylindrical means rotatably supported within said chamber,
conduit means for withdrawing an effluent portion of said liquid mixture containing an increased concentration of light solid particles from within said cylindrical means,
conduit means for withdrawing an underflow portion of said liquid mixture having an increased concentration of heavy solid particles from said chamber outside of said cylindrical means, said cylindrical means having a cylindrical outer surface provided with a plurality of openings each of which is several times the cross sectional area of the largest particles in said liquid mixture to prevent bridging of said particles over said openings, the total area of said openings being between 5 and 30 percent of the cylindrical surface area of said cylindrical means, said cylindrical means having a length to radius ratio of at least 6.0, and the ratio of the diameter of said openings to the diameter of said cylindrical means being between about 0.01 and 0.1, and means to support and rotate said cylindrical means at a predetermined speed within said chamber to effect selective separation of said solid particles.

6. In a method according to claim 4, wherein said fluid mixture is a drilling fluid containing cuttings and weighting agent particles, the cuttings are the solid particles withdrawn in the effluent portion, and the weighting agent particles are the solid particles withdrawn in the underflow portion.

References Cited

UNITED STATES PATENTS

| | | |
|---|---|---|
| 1,664,769 | 4/1928 | Chance. |
| 2,225,973 | 12/1940 | Brown et al. _____ 209—12 |
| 2,311,606 | 2/1943 | Bannister. |
| 2,678,133 | 5/1954 | Thayer et al. |
| 2,928,546 | 3/1960 | Church. |
| 2,955,753 | 10/1960 | O'Conor et al. _____ 233—19 X |
| 3,070,291 | 12/1962 | Bergey _____ 233—19 |
| 3,126,337 | 3/1964 | Smith _____ 233—7 X |
| 1,025,059 | 4/1912 | Hatton _____ 210—78 X |

HARRY B. THORNTON, *Primary Examiner.*

R. HALPER, *Assistant Examiner.*